(12) United States Patent
Yamazaki et al.

(10) Patent No.: US 9,165,183 B2
(45) Date of Patent: Oct. 20, 2015

(54) ESTIMATING APPARATUS, METHOD THEREOF, AND COMPUTER PROGRAM PRODUCT THEREFOR

(71) Applicant: KABUSHIKI KAISHA TOSHIBA, Minato-ku, Tokyo (JP)

(72) Inventors: Masaki Yamazaki, Tokyo (JP); Tomokazu Kawahara, Kanagawa (JP); Tatsuo Kozakaya, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/169,243

(22) Filed: Jan. 31, 2014

(65) Prior Publication Data

US 2014/0219518 A1 Aug. 7, 2014

(30) Foreign Application Priority Data

Feb. 6, 2013 (JP) ................................. 2013-021396

(51) Int. Cl.
*G06K 9/00* (2006.01)
(52) U.S. Cl.
CPC ................................. *G06K 9/00268* (2013.01)
(58) Field of Classification Search
CPC .................. G06K 2009/00322; G06K 9/00628
See application file for complete search history.

(56) References Cited

U.S. PATENT DOCUMENTS

| 7,319,779 | B1 * | 1/2008 | Mummareddy et al. ....... 382/118 |
| 8,498,491 | B1 * | 7/2013 | Steffens ......................... 382/224 |
| 2005/0180626 | A1 | 8/2005 | Moon et al. |
| 2012/0308087 | A1 * | 12/2012 | Chao et al. ..................... 382/115 |

FOREIGN PATENT DOCUMENTS

JP 2009-271885 11/2009

OTHER PUBLICATIONS

Fu et al., Image-Based Human Age Estimation by Manifold Learning and Locally Adjusted Robust Regression, IEEE Trans. Image Processing, vol. 17, No. 7, pp. 1178-1188, 2008.

* cited by examiner

*Primary Examiner* — Siamak Harandi
(74) *Attorney, Agent, or Firm* — Amin, Turocy & Watson, LLP

(57) ABSTRACT

An estimating apparatus configured to estimate a correct attribute value is provided. The estimating apparatus extracts feature quantities from an image including a person, calculates a first likelihood of the feature quantity for respective attribute classes; calculating second likelihoods for the respective attribute classes from the first likelihoods for the respective attribute classes; specifies the attribute class having the highest second likelihood; calculates an estimated attribute value of the specific attribute class and estimated attribute values of selected classes by using the feature quantity; and applies the second likelihood on the estimated attribute value of the specific attribute class as a weight, applies the second likelihoods on the estimated attribute values of the selected classes as a weight and add the same, and calculates a corrected attribute value of the specific attribute class.

10 Claims, 8 Drawing Sheets

FIG. 3

| Age Class: [age] | Positive (age) | Negative (age) |
| --- | --- | --- |
| Class 1: [0-4] | 0-4 | other than 0-4 |
| Class 2: [2-6] | 2-6 | other than 2-6 |
| Class 3: [5-9] | 5-9 | other than 5-9 |
| Class 4: [7-11] | 7-11 | other than 7-11 |
| Class 5: [10-14] | 10-14 | other than 10-14 |
| Class 6: [12-16] | 12-16 | other than 12-16 |
| Class 7: [15-19] | 15-19 | other than 15-19 |
| Class 8: [17-24] | 17-24 | other than 17-24 |
| Class 9: [20-29] | 20-29 | other than 20-29 |
| Class 10: [25-34] | 25-34 | other than 25-34 |
| Class 11: [30-39] | 30-39 | other than 30-39 |
| Class 12: [35-44] | 35-44 | other than 35-44 |
| Class 13: [40-49] | 40-49 | other than 40-49 |
| Class 14: [45-54] | 45-54 | other than 45-54 |
| Class 15: [50-59] | 50-59 | other than 50-59 |
| Class 16: [55-64] | 55-64 | other than 55-64 |
| Class 17: [60-100] | 60-100 | other than 60-100 |

FIG. 4

| Class 1: | Class 3: | Class 5: | Class 7: | Class 9: | Class 11: | Class 13: | Class 15: | Class 17: |
| --- | --- | --- | --- | --- | --- | --- | --- | --- |
| [0-4] | [5-9] | [10-14] | [15-19] | [20-29] | [30-39] | [40-49] | [50-59] | 60 and over |

| Class 2: | Class 4: | Class 6: | Class 8: | Class 10: | Class 12: | Class 14: | Class 16: |
| --- | --- | --- | --- | --- | --- | --- | --- |
| [2-6] | [7-11] | [12-16] | [17-24] | [25-34] | [35-44] | [45-54] | [55-64] |

\* 5 years increment for ages up to 19 years old, and 10 years increment for ages 20 years old and older (unit: numeric values in square brackets are ages)

FIG. 5

| | | | | | | | | | | | |
|---|---|---|---|---|---|---|---|---|---|---|---|
| [0-4] likelihood: low | [5-9] likelihood: low | [10-14] likelihood: low | [15-19] likelihood: low | [20-29] likelihood: high | [30-39] likelihood: high | [40-49] likelihood: low | [50-59] likelihood: low | 60 and over likelihood: low | | | |
| | [2-6] likelihood: low | [7-11] likelihood: low | [12-16] likelihood: low | [17-24] likelihood: medium | [25-34] likelihood: high | [35-44] likelihood: medium | [45-54] likelihood: low | [55-64] likelihood: low | | | |

FIG. 8

| vertical 45° lateral 90° | vertical 45° lateral 75° | vertical 45° lateral 60° | vertical 45° lateral 45° | vertical 45° lateral 30° | vertical 45° lateral 15° | vertical 45° lateral 0° |
|---|---|---|---|---|---|---|
| vertical 30° lateral 90° | vertical 30° lateral 75° | vertical 30° lateral 60° | vertical 30° lateral 45° | vertical 30° lateral 30° | vertical 30° lateral 15° | vertical 30° lateral 0° |
| vertical 15° lateral 90° | vertical 15° lateral 75° | vertical 15° lateral 60° | vertical 15° lateral 45° | vertical 15° lateral 30° | vertical 15° lateral 15° | vertical 15° lateral 0° |
| vertical 0° lateral 90° | vertical 0° lateral 75° | vertical 0° lateral 60° | vertical 0° lateral 45° | vertical 0° lateral 30° | vertical 0° lateral 15° | vertical 0° lateral 0° |
| vertical -15° lateral 90° | vertical -15° lateral 75° | vertical -15° lateral 60° | vertical -15° lateral 45° | vertical -15° lateral 30° | vertical -15° lateral 15° | vertical -15° lateral 0° |
| vertical -30° lateral 90° | vertical -30° lateral 75° | vertical -30° lateral 60° | vertical -30° lateral 45° | vertical -30° lateral 30° | vertical -30° lateral 15° | vertical -30° lateral 0° |
| vertical -45° lateral 90° | vertical -45° lateral 75° | vertical -45° lateral 60° | vertical -45° lateral 45° | vertical -45° lateral 30° | vertical -45° lateral 15° | vertical -45° lateral 0° |

INTEGRATE LIKELIHOODS OF 5 CLASSES

VERTICAL 0° LATERAL 45° CLASS DETERMINATION = VERTICAL 0° LATERAL 60° CLASS LIKELIHOOD + VERTICAL 15° LATERAL 45° CLASS LIKELIHOOD + 2 × VERTICAL 0° LATERAL 45° CLASS LIKELIHOOD + VERTICAL 0° LATERAL 30° CLASS LIKELIHOOD + VERTICAL-15° LATERAL 45° CLASS LIKELIHOOD

ESTIMATING APPARATUS, METHOD THEREOF, AND COMPUTER PROGRAM PRODUCT THEREFOR

CROSS-REFERENCE TO RELATED APPLICATIONS

This application is based upon and claims the benefit of priority from the prior Japanese Patent Application No. 2013-21396, filed on Feb. 6, 2013; the entire contents of which are incorporated herein by reference.

FIELD

Embodiments described herein relate generally to an estimating apparatus, a method thereof, and a computer program product therefor.

BACKGROUND

In order to estimate attribute values (ex. age, angle of facing direction, body posture, etc.) expressed by consecutive volumes in detail from among person attributes, a large quantity of learning data belonging to attribute classes composed of areas of the attribute values needs to be prepared. Therefore, if there is a small amount of learning data, learning is enabled by roughly classifying the attribute classes and the attribute value may be estimated stably.

When the attribute value to be specified is expressed by one-dimensional vector such as age (0 to 100 years old), an attribute value (age) of a person is estimated by preparing a plurality of determiners configured to determine whether it is higher or lower than a predetermined reference age (10 years old, 20 years old, . . . 60 years old) for determining respective attribute classes (age class) configured to determine a rough age of the person, adding all results of determination (likelihoods) of the respective determiners, and specifying an age class having the highest likelihood as a result of determination.

However, as factors of erroneous determination of age estimation, there are cases where ages estimated by parts of the body are significantly different such as "a person having a young face (30's) and gray hair (50' S)" or "a smiley face (30's from the entire face is but 50's from wrinkles around the mouth)", and in such cases, a high likelihood may be output both for a correct age class and for an age class which is far from the correct age class.

In such a case, in the method of the related art, since the age of a person is estimated by integrating all the results of determination of the plurality of age class determinations, there is a problem that the estimated age may be far away from a correct age.

In view of such problems described above, it is an object of the embodiment of the invention to provide an estimating apparatus capable of estimating an attribute value correctly, a method thereof, and a computer program product therefor.

BRIEF DESCRIPTION OF THE DRAWINGS

FIG. 3 is a configuration drawing of a class;
FIG. 4 is a drawing illustrating a segment of the class;
FIG. 5 is a drawing illustrating a result of calculation of a second likelihood;
FIG. 8 is a configuration drawing of a class.

DETAILED DESCRIPTION

Figure 1:
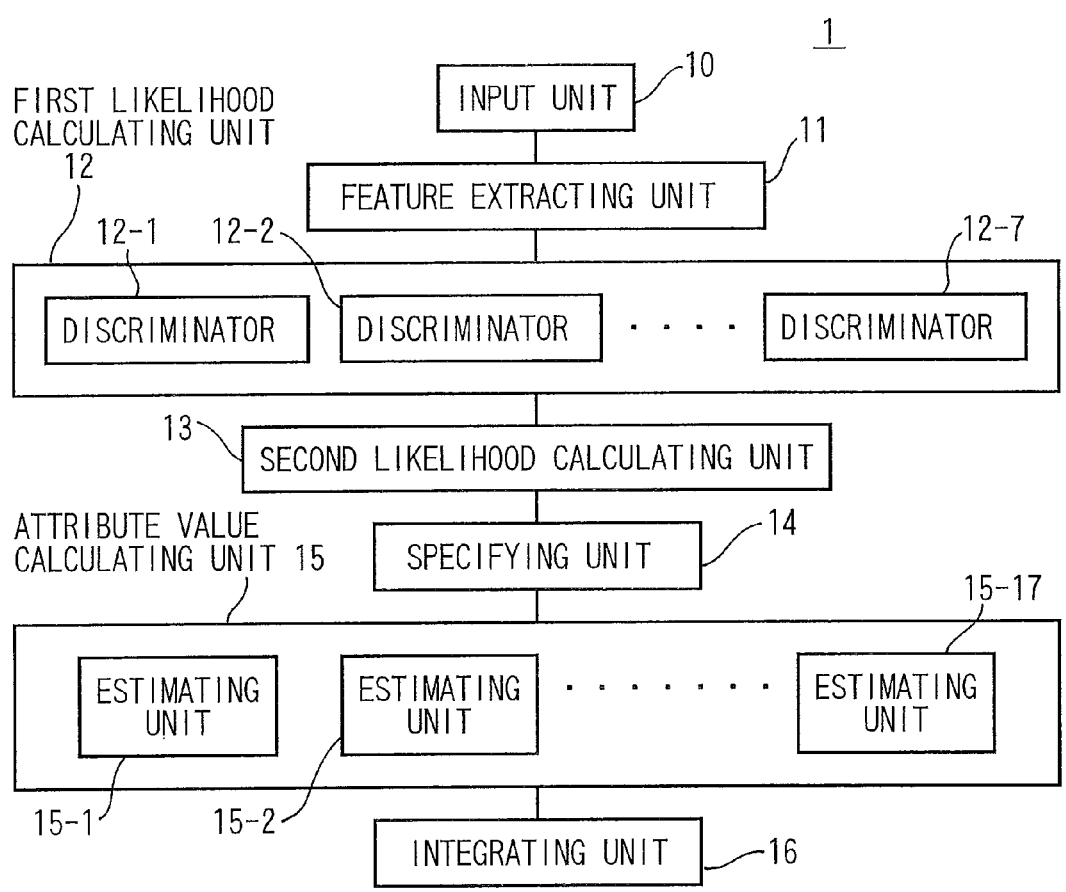
FIG. 1 is a block diagram illustrating an estimating apparatus of Embodiment 1.

According to embodiments, an estimating apparatus includes: an acquiring unit configured to acquire an image; a feature extracting unit configured to extract human features from the image; a first likelihood calculating unit configured to calculate first likelihoods which indicate degrees that the feature quantity belongs to for respective classes formed with segments of consecutive attribute values relating to the person from the feature quantity; (1) a second likelihood calculating unit configured to calculate second likelihoods for the respective attribute classes from the first likelihoods for the respective attribute classes and (2) add the first likelihood of a target class as the attribute class for calculating the second likelihood and the first likelihoods of selected classes which are the attribute classes near the target class to calculate the second likelihood of the target class; a specifying unit configured to specify the attribute class having the highest second likelihood from among the second likelihoods for the respective attribute classes; an attribute value calculating unit configured to calculate an estimated attribute value of the specific attribute class and estimated attribute values of the selected classes when setting the specific attribute class as the target class respectively by using the feature quantity; and an integrating unit configured to apply the second likelihood of the specific attribute class on the estimated attribute value of the specific attribute class as a weight, apply the second likelihoods of the selected classes on the estimated attribute values of the selected classes and add the same, and calculate a corrected attribute value of the specific attribute class.

Referring now to the drawings, an estimating apparatus 1 according to Embodiment 1 will be described.

Embodiment 1

Referring now to FIG. 1 to FIG. 5, the estimating apparatus 1 according to Embodiment 1 will be described. The estimating apparatus 1 estimates an age as an attribute value. In other words, in Embodiment 1, the estimating apparatus 1 estimates an attribute value continuing in one direction one-dimensionally as ages.

A configuration of the estimating apparatus 1 will be described with reference to FIG. 1. FIG. 1 is a block diagram illustrating the estimating apparatus 1.

The estimating apparatus 1 includes an input unit 10, a feature extracting unit 11, a first likelihood calculating unit 12, a second likelihood calculating unit 13, a specifying unit 14, an attribute value calculating unit 15, and an integrating unit 16.

The input unit 10 includes a monitor camera configured to take image, a communication device configured to receive image, and an acquiring unit, and is configured to acquire image in which at least the face of a person appears.

The feature extracting unit 11 is configured to extract facial features from the image input thereto.

The first likelihood calculating unit 12 is configured to calculate a first likelihood from the feature quantity. The first likelihood is a value indicting how much the feature quantity applies to the respective attribute classes (age class, referred simply as "class"). The attribute class includes segments of consecutive attribute values (ages).

The second likelihood calculating unit 13 is configured to calculate a second likelihood by adding a predetermined number of the first likelihoods from neighbor classes in a descendent order, with respect to the first likelihoods of the respective classes.

The specifying unit 14 is configured to determine a class having the highest second likelihood from the second likelihoods of the respective classes.

The attribute value calculating unit 15 is configured to calculate an estimated age from the class specified by the specifying unit 14 and the feature quantity.

The integrating unit 16 is configured to calculate a corrected age of the face of a person appeared in an input image by applying the second likelihoods of the respective classes to the respective estimated ages calculated by the attribute value calculating unit 15 as weights and adding the same.

Figure 2:
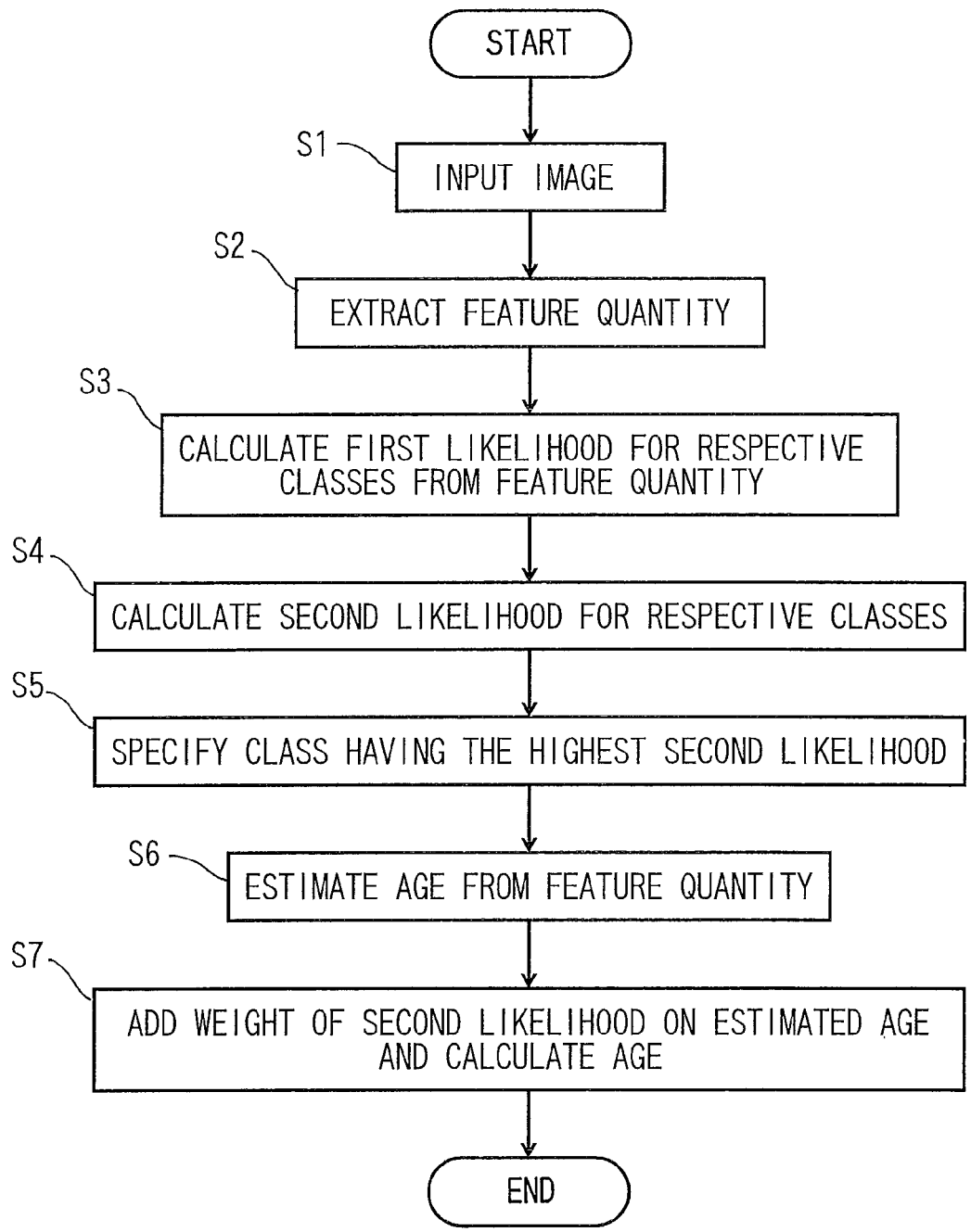
FIG. 2 is a flowchart of the estimating apparatus.

Subsequently, an operation of the estimating apparatus 1 will be described with reference to a flowchart in FIG. 2.

In Step S1, the input unit 10 inputs image by using the monitor camera or the communication device configured to receive the image.

In Step S2, the feature extracting unit 11 extracts the feature quantity from the image input from the input unit 10.

The feature extracting unit 11 cuts out a face area from the image as a first process, corrects a facing direction in the face area as a second process, and extracts the feature quantity (luminance, edge information, etc.) from the corrected face area as a third process. For example, as the feature quantity of the edge information, a vector using a co-occurrence relationship of the direction of luminance gradient is used.

In Step S3, the first likelihood calculating unit 12 calculates a "first likelihood S" indicating the degree that the feature quantity belongs to the respective classes including the consecutive age segments (how much the feature quantity belongs to).

As illustrated in FIG. 3, a class i is classified into 17 classes including "age 0-4", "age 2-6", "age 5-9", "age 7-11", "age 10-14", "age 12-16", "age 15-19", "age 17-24", "age 20-29", "age 25-34", "age 30-39", "age 35-44", "age 40-49", "age 45-54", "age 50-59", "age 55-64", and "age 60 and over". In FIG. 3, ages included in the class are expressed as "Positive" and if the age is not included in the class, "Negative" is displayed.

The first likelihood calculating unit 12 includes discriminators 12-1 to 12-17 for the respective classes i for calculating a first likelihood Si for the respective classes i. The discriminators 12-1 to 12-7 for the respective classes are configured by using methods such as Support Vector Machine (SVM), a neural network, a k-neighborhood determiner, and Bayes classification. In the following description, the first likelihood S is within a range of degree of similarity from 0 to 1, and objects to be compared are determined to be more similar as the first likelihood S gets closer to "1". The same applies to the second likelihood. When the first likelihood and the second likelihood are both expressed by distances, the smaller the distance, the more the objects are similar. However, in this specification, in order to unify the description of "large (high)" and "small (low)", it is defined that the higher the first likelihood, the larger the degree of belonging to the attribute class becomes. The same applies to the second likelihood.

The discriminator 12-1 calculates a first likelihood S1 of the feature quantity belonging to the class 1 (age 0-4), the discriminator 12-2 calculates a first likelihood S2 of the feature quantity belonging to the class 2 (age 2-6) and so forth in the same manner, and the discriminator 12-17 calculates the first likelihood S17 of the feature quantity belonging to the class 17 (age 60-100).

In order to estimate the ages finely for the first likelihood calculating unit 12, gaps between the classes are preferably set to be small. However, if the learning data belonging to each class is reduced, the accuracy of estimation for each class is lowered. Therefore, in order to reduce the gap between the classes without reducing the amount of learning data of the respective classes, the ages included in the classes are overlapped with each other. More specifically, as illustrated in FIG. 4, the age ranges which constitute the respective classes are configured to overlap with at least two adjacent classes.

The classes for early ages (up to early 20's) are configured with smaller age increment than the classes for young ages or older (from late 20's onward). The reason is that the tendency with time significantly changes during growth phase and hence it is effective to configure the classes with a smaller age range. However, the age range is not limited as described above, and a given age range may be employed.

In Step S4, the second likelihood calculating unit 13 calculates a second likelihood Ti by adding the weights of the predetermined N first likelihoods from neighbor classes in a descendent order to the first likelihoods Si of the respective classes i calculated by the first likelihood calculating unit 12 as illustrated in FIG. 5.

In the case of N=2, two attribute classes having large first likelihood centered on a class whose second likelihood Ti is wanted (hereinafter, referred to as a "target class" are selected. The selected attribute classes are referred to as "selected classes", hereinafter. For example, the second likelihood calculating unit 13 selects classes i−1 and i+1 adjacently before and after the target class as the selected classes.

Then, as shown by Expression (1), the second likelihood calculating unit 13 calculates the second likelihood Ti by applying a weight for concern on the first likelihood Si of the target class i, and applying a weight for selection on the first likelihoods Si−1 and Si+1 of the selected classes. For example, N=2 is used as the weight for concern, and "1" is used as the weight for selection.

$$T_1 = S_{i-1} + 2 \times S_1 + S_{i+1} \quad (1)$$

When N=3, the second likelihood calculating unit 13 calculates the second likelihood Ti by selecting the classes i−2, i−1 and i+1 as the selected class centered on the target class i from the class having a high first likelihood S in a descending order, applying a weight for concern on the first likelihood Si, and applying a weight for selection on the first likelihoods Si−2, Si−1 and Si+1. In this case, for example, N=3 is used as the weight for concern, and "1" is used as the weight for selection.

When N=4, the second likelihood calculating unit 13 calculates the second likelihood Ti by selecting the classes i−2, i−1, i+1, and i+2 as the selected class centered on the target class i in a descending order from the class having a high first likelihood S, applying a weight for concern on the first likelihood Si, and applying a weight for selection on the first likelihoods Si−2, Si−i, Si+1, and Si+2. For example, N=4 is used as the weight for concern, and "1" is used as the weight for selection.

When the class 1 is a target class, there is no class before. Therefore, the second likelihood T1 of the class 1 may be calculated by using the first likelihoods S2 and S3 of the subsequent class 2 or 3 or the first likelihood S1 of the class 1 may be used as the second likelihood T1 (=S1) as is. The same process is applied to the class 17.

Since the change with time is significantly great in the ages of growth phase and hence the characteristic of how the face looks is significantly different even among the classes nearby.

Therefore, the values of N for early ages (up to early 20's) are set to small values and the values of N for young ages or older (from late 20's onward) are set to large values.

The range of selection of the selected classes is located near the target class and, more specifically, the range from the target class (number of classes) is determined in advance. For example, in the case where the number of classes is 17, the range to be selected is the adjacent classes, for example, two classes to three classes, and in a case where the number of classes is 100, classes 4 to 10 classes apart may be included in the range.

Also, the selected classes may not be classes consecutive from the target class if the classes are selected from the one having a high likelihood in the descendent order, and may be selected by one to three classes skipped.

The weights for concern are always set to be weights larger than the weights for selection.

The age ranges for configuring respective classes are overlapped so as to include the age ranges of the adjacent before and after classes. Therefore, the first likelihoods of the adjacent classes also tend to increase in addition to the first likelihood of the correct class. Therefore, the second likelihood calculating unit 13 adds the first likelihood of one class and adjacent classes as the second likelihood. More specifically, the second likelihood calculating unit 13 is configured not to determine whether or not the class is correct only on the basis of the first likelihood of the one class (hereinafter, this one class is referred to as "pseudo correct solution class"), but to determine that the pseudo correct solution class is a real correct class when the first likelihoods of the selected classes adjacent to the pseudo correct solution class are also high, whereby the stability of the solution is improved.

In Step S5, the specifying unit 14 specifies the class having the highest second likelihood Ti as shown in expression (2).

$$\text{Class } i = \arg \max_{i=1,\ldots,17}[T_i] \quad (2)$$

The subsequent description will be given on the assumption that the specifying unit 14 has specified the class 10 for 25 to 34 years old.

In Step S6, the attribute value calculating unit 15 calculates an estimated age from the feature quantity extracted by the feature extracting unit 11. For this estimation, the attribute value calculating unit 15 includes 17 age estimating units (hereinafter, simply referred to as "estimating unit") 15-1 to 15-17, and these estimating units 15-1 to 15-17 are configured for the same age ranges as the class of the discriminators 12-1 to 12-17 of the first likelihood calculating unit 12. More specifically, in order to estimate the age by consecutive values (unit of 1 year old), the attribute value calculating unit 15 includes the estimating unit 15-1 for "age 0-4", the estimating unit 15-2 for "age 2-6", the estimating unit 15-3 for "age 5-9" and, in the same manner, the estimating unit for "age 7-11", "10-14", and the estimating units 15-4 to 15-17 for "age 12-16", "age 15-19", "age 17-24", "age 20-29", "age 25-34", "age 30-39", "age 35-44", "age 40-49", "age 45-54", "age 50-59", "age 55-64", and "age 60 and over", respectively. The respective estimating units 15-1 to 15-17 employ the method such as Support Vector Regression (SVR). Other methods may be employed. For example, the neural network, the k-neighborhood discriminator, a mixture Gaussian distribution (GMM) classifier may be employed.

The attribute value calculating unit 15 calculates an estimated age Vi from the feature quantity by using the estimating unit corresponding to the class i specified by the specifying unit 14, and calculates estimated ages Vi−1 and Vi+1 by using the estimating units of the selected classes (i−1) and (i+1) corresponding to the specific class from the feature quantity. The selected classes are the selected classes in the second likelihood calculating unit 13, and mean the selected classes when the specific class is the target class.

When the classes specified by the specifying unit 14 is the class 10 for the age 25-34, the attribute value calculating unit 15 may calculate as an estimated age V9 (for example 27.9 years old), V10 (for example, 29.5 years old), and V11 (for example, 31.1 years old) from the feature quantity by using the estimating unit 15-9 for "age 20-29", the estimating unit 15-10 for "age 25-34", and the estimating unit 15-11 for "age 30-39".

In Step S7, as shown by Expression (3), the integrating unit 16 calculates a corrected age Value of the person in the input image by applying the second likelihoods Ti−1, Ti, and Ti+1 calculated by the second likelihood calculating unit 13 on the estimated age Vi−1, Vi, and Vi+1 calculated by the respective estimating units of the attribute value calculating unit 15, and adding the same.

$$\text{Value} = T_{i-1} \times V_{i-1} + T_i \times V_i + T_{i+1} \times V_{i+1} \quad (3)$$

The integrating unit 16 does not use the second likelihoods Ti−1, Ti, and Ti+1 not as-is, but normalizes the same so that the sum of Ti−1, Ti, and Ti+1 becomes "1".

For example, in the case of the example given above, the calculation will be 0.2×27.9 years old+0.7×29.5 years old+0.1×31.1 years old=corrected age 29.34.

In Embodiment 1, even though the first likelihood of the correct class and the first likelihood of the erroneous class away from the correct class are both high, the first likelihood of the selected class near the erroneous class has a low first likelihood. In other words, the selected class near the correct class outputs a high first likelihood. Therefore, the corrected age close to the correct age may be calculated by adding the first likelihood of the selected class nearby and specifying the correct class.

Modifications of Embodiment 1 will be described.

A first modification will be described. The first likelihood and the second likelihood are within a range from 0 to 1, and objects to be compared are determined to be more similar as the likelihoods gets closer to "1". However, a configuration in which the smaller the first likelihood and the second likelihood, the more the objects to be compared are similar may be employed. For example, the distance of the objects to be compared may be used for the first likelihood and the second likelihood.

A second modification will be described. The first likelihood calculating unit 12 may be configured to use discriminators prepared separately for attributes such as sexes, races, makeup, illumination environment, and switch the discriminators to a discriminator of the class which matches the attributes such as the sexes, the races, and the makeup, with using an attribute determination process (the sexes, the races, the makeup, or the like), at the time of estimating the age.

Embodiment 2

Figure 6:
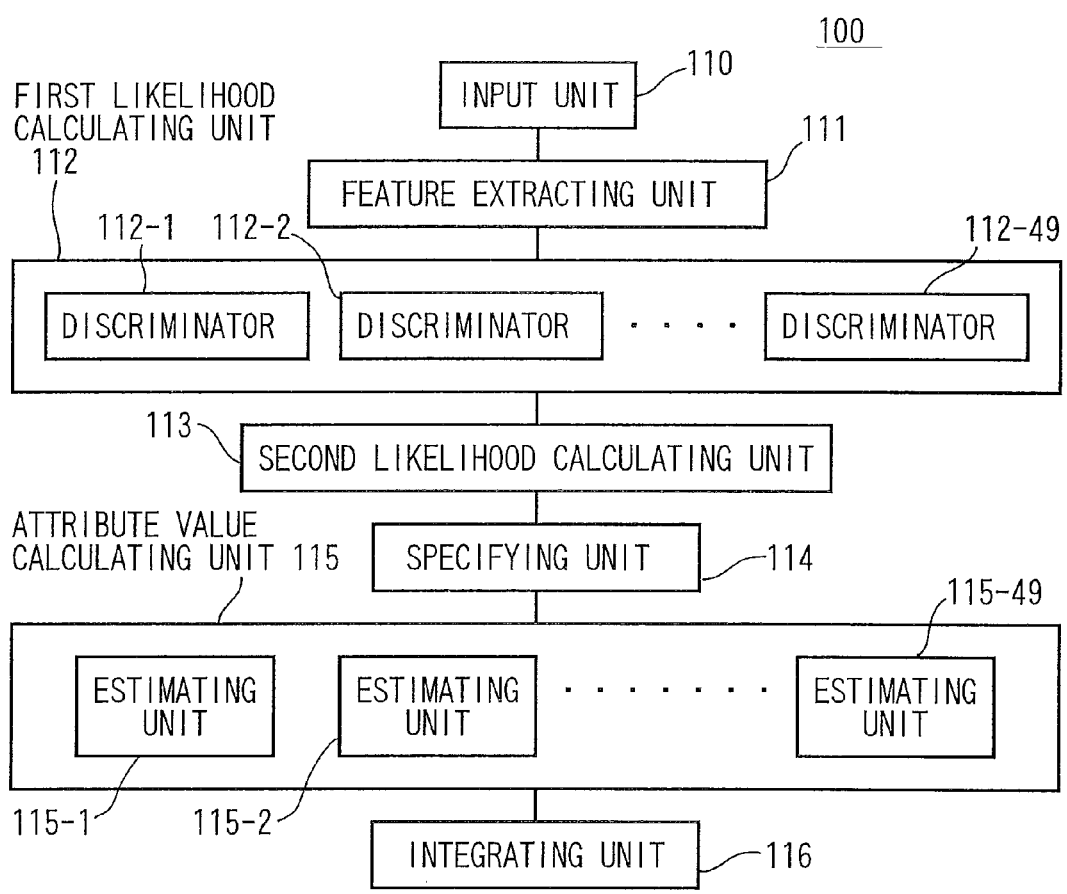
FIG. 6 is a block diagram illustrating an estimating apparatus of Embodiment 2.
Figure 7:
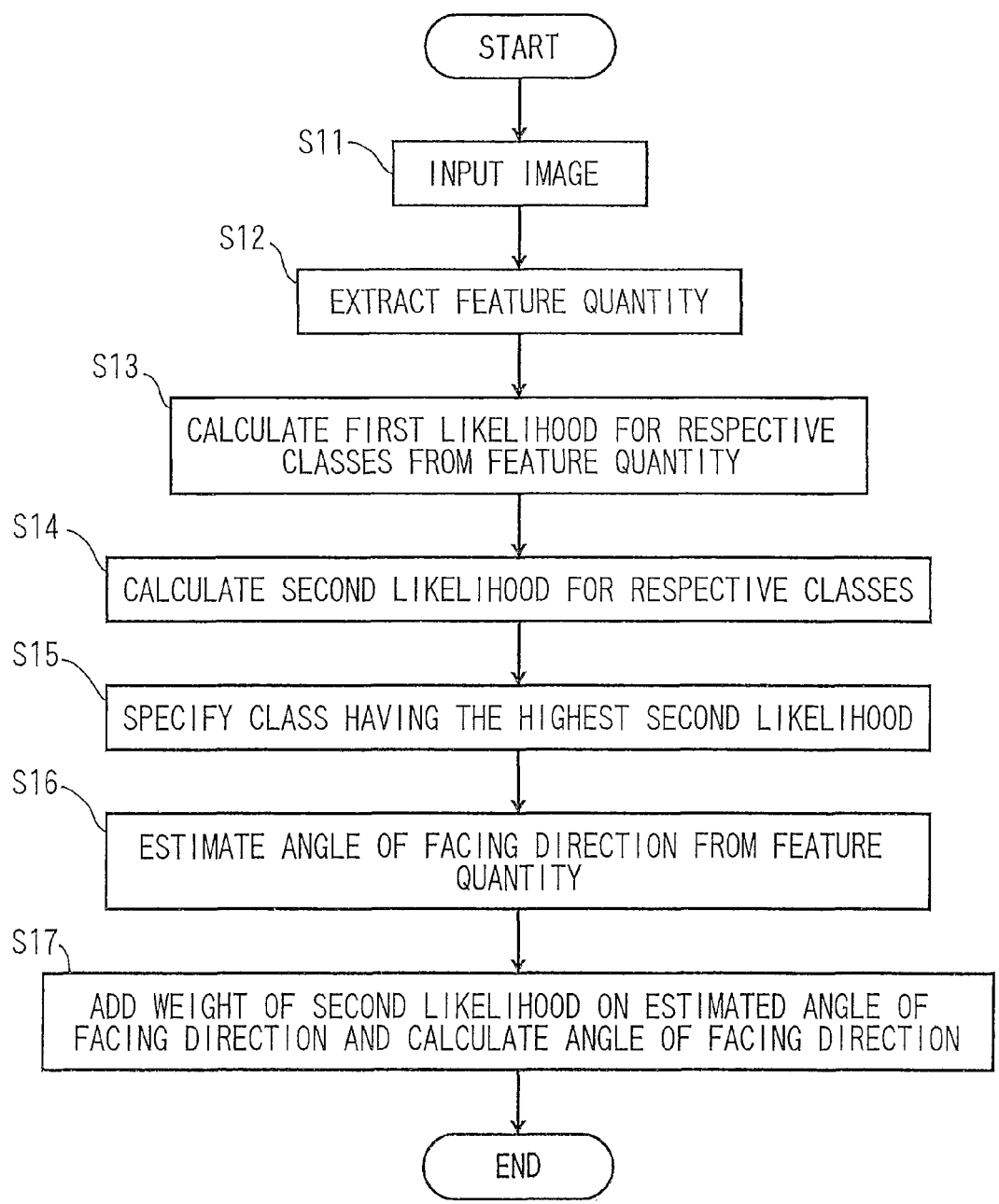
FIG. 7 is a flowchart of the estimating apparatus.

Referring now to FIG. 6 to FIG. 8, an estimating apparatus 100 according to Embodiment 2 will be described. The attribute value of Embodiment 2 is an angle of facing direction. Embodiment 2 is different from Embodiment 1 in that although the attribute value of the one-dimensional vector such as the age is estimated in Embodiment 1, an attribute value of a two-dimensional vector such as the angle of facing direction is estimated in Embodiment 2.

The estimating apparatus 100 includes, as illustrated in FIG. 6, an input unit 110, a feature extracting unit 111, a first likelihood calculating unit 112, a second likelihood calculating unit 113, a specifying unit 114, an attribute value calculating unit 115, and an integrating unit 116.

Referring now to a flowchart in FIG. 7, the operation of the estimating apparatus 100 of Embodiment 2 will be described. Description on the same configuration and the operation as the estimating apparatus 1 of Embodiment 1 will be omitted.

In Step S11, the input unit 110 inputs image in which a face of a person appears by using the monitor camera or the communication device configured to receive the image.

In Step S12, the feature extracting unit 111 extracts the feature quantity of the face from the image input from the input unit 110.

In Step S13, the first likelihood calculating unit 112 calculates a first likelihood S(i, j) which indicates how much the feature quantity belongs to the respective facing direction range classes (hereinafter, referred to simply as "class") (i, j) composed of two-dimensional vectors (vertical and lateral angle regions) as illustrated in FIG. 8. The position of the class is specified by i and j, and there are 49 classes in total as illustrated in FIG. 8.

Therefore, the first likelihood calculating unit 112 includes discriminators 112-1 to 112-49 for the respective classes configured at intervals of 15° for a face direction range of 45° in the vertical direction and 90° in the lateral direction for calculating the first likelihood of the feature quantity. The discriminators 112-1 to 112-49 for the respective classes are configured by using methods such as the Support Vector Machine (SVM), the neural network, the k-neighborhood determiner, and the Bayes classification.

Although the gap between the classes is preferably set to be small in order to estimate the angle of facing direction at small angle increment, if the learning data belonging to each class is reduced, the accuracy of estimation for each class is lowered. Therefore, in order to reduce the gap between the classes without reducing the amount of learning data of the respective classes, the angles included in the classes are overlapped with each other in the same manner as Embodiment 1. However, the range of the angle of facing direction is not limited, and a given range of angle of facing direction may be employed.

In Step S14, the second likelihood calculating unit 113 calculates the second likelihood by adding the predetermined N first likelihoods from neighbor classes in a descendent order to the first likelihoods of the respective classes calculated by the first likelihood calculating unit 112.

In the case of N=4, four selected classes having large first likelihood centered on a target class whose second likelihood Ti is wanted are selected. The reason why four selected classes are selected is that the attribute value is expressed by two-dimensional consecutive values, which are angles of facing direction (45° in the vertical direction and 90° in the lateral direction). In other words, as shown by Expression (4), the second likelihood calculating unit 113 obtains a second likelihood T(i, j) by applying a weight for concern on the first likelihood of the target class, and applying a weight for selection on the first likelihoods of the selected classes (four classes) in the vertical and lateral directions. For example, N=4 is used as the weight for concern, and "1" is used as the weight for selection.

$$t(i,j) = S_{(i,j-1)} + S_{(i-1,j)} + 4 \times S_{(i,j)} + S_{(i+1,j)} + S_{(i,j+1)} \quad (4)$$

When the angle of facing direction is larger than the angle of the face facing the front, the characteristic of how the face looks is significantly different even among the selection classes nearby. Therefore, the values of N of the class in which the angle of facing direction is large are set to small values, and the values of N of the class in which the angle of facing direction is close to the angle of the face facing the front are set to large values.

Since the angles of facing direction classified into the respective classes are overlapped so as to include the angles of facing direction of the classes adjacent to the vertical direction and the lateral direction, the first likelihoods of the adjacent selected classes are also tend to increase in addition to the first likelihood of the correct class. In other words, the second likelihood calculating unit 113 is configured not to determine whether or not the class is correct only on the basis of the first likelihood of the one class (hereinafter, this one class is referred to as "pseudo correct solution class"), but to determine that the pseudo correct solution class is a real correct class when the first likelihoods of the selected classes adjacent to the pseudo correct solution class, are also high, whereby the stability of the solution is improved.

In Step S15, the specifying unit 114 specifies a class having the highest second likelihood as shown in Expression (5).

$$\text{Class } (i, j) = \arg\max_{i,j} [T_{(i,j)}] \quad (5)$$

In Step S16, the attribute value calculating unit 115 calculates an estimated facing direction from the feature quantity extracted by the feature extracting unit 111. For this calculation, the attribute value calculating unit 115 includes 49 angle of facing direction estimating units (hereinafter, simply referred to as "estimating unit") 115-1 to 115-49, and these estimating units 115-1 to 115-49 are configured for the same angle of facing direction ranges as the classes of the discriminators 112-1 to 112-49 of the first likelihood calculating unit 112. The respective estimating units 115-1 to 115-49 employ the method such as the Support Vector Regression (SVR). Other methods may be employed. For example, the neural network, the k-neighborhood discriminator, the mixture Gaussian distribution (GMM) classifier may be employed.

The attribute value calculating unit 115 calculates an estimated angle of facing direction V(i, j) from the feature quantity by using the estimating unit corresponding to the class i specified by the specifying unit 114, and calculates estimated angles of facing directions V(i,j−1), V(i−1,j), V(i+1,j), and V(i,j+1) by using the estimating units of the selected classes (i,j−1), (i−1,j), (i+1,j), and (i,j+1) adjacent thereto before and after thereof from the feature quantity. The selected classes are the selected classes when the specific class is the target class.

In Step S17, the integrating unit 116 calculates the corrected angle of facing direction of the input image by applying weight on the estimated angle of facing direction V (i, j) calculated by the attribute value calculating unit 115 and adding the same.

The integrating unit 116, as shown by Expression (6), calculates a corrected angle of facing direction Value of the input image by adding the second likelihoods calculated by the second likelihood calculating unit 113 by applying weight on the estimated angle of facing direction V(i, j) calculated by the estimating units.

$$\text{Value} = T_{(i,j-1)} \times V_{(i,j-1)} + T_{(i-1,j)} \times V_{(i-1,j)} + T_{(i,j)} \times V_{(i,j)} + T_{(i+1,j)} \times V_{(i+1,j)} + T_{(i,j+1)} \times V_{(i,j+1)} \quad (6)$$

According to Embodiment 2, the corrected angle of facing direction, which is a correct angle of facing direction can be calculated by specifying the correct class by adding the first likelihoods of the adjacent selected classes to the first likelihood of the specific target class.

A modification of Embodiment 2 will be described. The first likelihood calculating unit 112 may be configured to use class discriminators prepared separately for attributes such as sexes, races, makeup, illumination environment, and switch the discriminators to a discriminator of the class which matches the attributes such as the sexes, the races, and the makeup, with using the attribute determination process (the sexes, the races, the makeup, or the like), at the time of estimating the angle of facing direction.

The estimating apparatuses 1 and 100 of the above-described embodiments are each provided with a control device such as a CPU (Central Processing Unit), a memory unit such as a ROM or a RAM, and an external memory apparatus such as an HDD or an SSD, and may be realized with a hardware configuration using a normal computer. The respective portions descried in the respective embodiments may be realized either as software or hardware.

The respective embodiments described above may be applied for security facilities configured to acquire attribute information such as the age, the sex, or the facing direction from images of persons took by security cameras installed in a town for specifying a person.

The respective embodiments described above may be utilized for collection of marketing data of clients in commercial facilities or delivery agents or digital signage (electronic signboard) which displays advertisements corresponding to the attributes of the individual persons.

In the embodiments described above, description has been made with the age (one-dimensional vector) and the angle of facing direction (two-dimensional vector) as the attribute values. However, the invention is not limited thereto, and may be handled in the same manner as the case in which the attribute value is expressed by three or more dimensional vectors (for example, body posture information).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An estimating apparatus comprising:
a memory that stores computer executable instructions; and
a processor, coupled to the memory, that executes the computer executable instructions to perform operations, comprising:
acquiring an image;
extracting human feature quantity from the image;
calculating, from the feature quantity, a first likelihood which indicates a degree of likelihood that the feature quantity belongs to for each of attribute classes, which comprises segments of consecutive attribute values relating to a person;
designating one of the attribute classes as a target class, designating two or more of the attribute classes near the target class as selected, and summing up the first likelihood of the target class and the first likelihoods of selected classes to obtain the second likelihood of the target class;
specifying one of the attribute classes as a specific attribute class, which has the highest second likelihood, from among the second likelihoods respectively for the attribute classes;
calculating an estimated attribute value of the specific attribute class and estimated attribute values of the selected classes by setting the specific attribute class as the target class, respectively by using the feature quantity; and
applying the second likelihood of the specific attribute class on the estimated attribute value of the specific attribute class as a weight to obtain a first value, applying the second likelihoods of the selected classes respectively on the estimated attribute values of the selected classes as weights to obtain a second value, and summing up the first value and the second value to obtain a corrected attribute value of the specific attribute class.

2. The apparatus according to claim 1, further comprising adapting a target-class weight for the first likelihood of the target class and selected-class weights for the first likelihoods of the selected classes
in a manner that the target-class weight is larger than any of the selected-class weight, and
applying the target-class weight with the first likelihood of the target class to obtain a third value and apply the selected-class weights on the first likelihoods of the selected classes to obtain a fourth value, and sum up the third value and the fourth value to obtain the second likelihood.

3. The apparatus according to claim 1, further comprising selecting a predetermined number of selected classes.

4. The apparatus according to claim 1, further comprising selecting the selected classes from the attribute classes near the target class in a manner that one having the highest value of the first likelihood is selected first, one having the second highest value of the first likelihood is selected second, and the attribute classes are selected by the values of the first likelihood in a descendent order as the selected classes.

5. The apparatus according to claim 1, further comprising selecting the selected classes from among the attribute classes which may be within a predetermined range from the target class.

6. The apparatus according to claim 1, further comprising selecting as the selected classes the attribute classes directly adjacent to the target class or the attribute classes that are distanced from the target class, by one to ten of the attribute classes.

7. The apparatus according to claim 1, further comprising adapting the attribute values included in one of the attribute classes, which are also included in an adjacent one of the attribute classes.

8. The apparatus according to claim 1, wherein the attribute value is an age or an angle of facing direction of the person.

9. An estimating method comprising:
acquiring an image;
extracting human feature quantity from the image;
calculating, from the feature quantity, a first likelihood which indicates a degree of likelihood that the feature quantity belongs to for each of attribute classes, which comprises segments of a consecutive attribute values relating to a person;
designating one of the attribute classes as a target class, designating two or more of the attribute classes near the target class as selected classes, and summing up the first likelihood of the target class and the first likelihoods of the selected classes to obtain the second likelihood of the target class;

specifying one of the attribute classes as a specific attribute class, which has the highest second likelihood, from among the second likelihoods respectively for the respective attribute classes;

calculating an estimated attribute value of the specific attribute class and estimated attribute values of the selected classes by setting the specific attribute class as the target class respectively by using the feature quantity; and applying the second likelihood of the specific attribute class on the estimated attribute value of the specific attribute class as a weight to obtain a first value, applying the second likelihoods of the selected classes on the estimated attribute values of the selected classes as weights to obtain a second value, and sum up the first value and the second value to obtain a corrected attribute value of the specific attribute class.

10. A computer program product comprising a non-transitory computer-readable medium containing a program executed by a computer, the program causing the computer to execute:

an acquiring function configured to acquire an image including a person;

a feature-extracting function configured to extract human feature quantity from the image;

a first likelihood calculating function configured to calculate, from the feature quantity, a first likelihood which indicates a degree of likelihood that the feature quantity belongs to for each of attribute classes, which comprise segments of a continuous attribute value relating to the person;

a second likelihood calculating function configured to designate one of the attribute classes as a target class, designate two or more of the attribute classes near the target class as selected classes, and sum up the first likelihood of the target class and the first likelihoods of the selected classes to obtain the second likelihood of the target class;

a specifying function configured to specify one of the attribute classes as a specific attribute class, which has the highest second likelihood, from among the second likelihoods respectively for the attribute classes;

an attribute value calculating function configured to calculate an estimated attribute value of the specific attribute class and estimated attribute values of the selected classes setting the specific attribute class as the target class respectively by using the feature quantity; and an integrating function configured to apply the second likelihood of the specific attribute class on the estimated attribute value of the specific attribute class as a weight to obtain a first value, apply the second likelihoods of the selected classes respectively on the estimated attribute values of the selected classes as weights to obtain a second value, and sum up the first value and the second value to obtain a corrected attribute value of the specific attribute class.

* * * * *